(12) United States Patent
Petrovic (10) Patent No.: US 7,024,018 B2
(45) Date of Patent: Apr. 4, 2006

(54) WATERMARK POSITION MODULATION

(75) Inventor: Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 690 days.

(21) Appl. No.: 10/128,812

(22) Filed: Apr. 23, 2002

(65) Prior Publication Data

US 2002/0168087 A1 Nov. 14, 2002

Related U.S. Application Data

(60) Provisional application No. 60/290,205, filed on May 11, 2001.

(51) Int. Cl.
*G06K 9/00* (2006.01)

(52) U.S. Cl. .................. 382/100; 382/232; 340/5.86; 380/253

(58) Field of Classification Search ............... 382/100, 382/112, 162, 182, 169–172, 232, 242, 250, 382/251, 191, 260, 248, 294, 103, 233–239, 382/243, 274, 276, 295, 305; 235/468; 713/176; 380/203, 210, 253, 254; 348/475; 360/60; 375/216; 340/5.86

See application file for complete search history.

(56) References Cited

U.S. PATENT DOCUMENTS

| | | |
|---|---|---|
| 3,406,344 A | 10/1968 | Hopper |
| 3,894,190 A | 7/1975 | Gassmann |
| 4,281,217 A | 7/1981 | Dolby |
| 4,512,013 A | 4/1985 | Nash et al. |
| 4,876,617 A * | 10/1989 | Best et al. ................ 360/60 |
| 4,972,471 A | 11/1990 | Gross et al. |
| 5,073,925 A | 12/1991 | Nagata et al. |
| 5,080,479 A | 1/1992 | Rosenberg |
| 5,113,437 A * | 5/1992 | Best et al. ................ 380/253 |
| 5,213,337 A | 5/1993 | Sherman |
| 5,319,735 A | 6/1994 | Preuss et al. |
| 5,379,345 A | 1/1995 | Greenberg |
| 5,450,490 A | 9/1995 | Jensen et al. |
| 5,473,631 A | 12/1995 | Moses et al. |
| 5,579,124 A | 11/1996 | Aijala et al. |
| 5,581,800 A | 12/1996 | Fardeau et al. |
| 5,613,004 A | 3/1997 | Cooperman et al. |
| 5,687,191 A * | 11/1997 | Lee et al. ................ 375/216 |
| 5,764,763 A | 6/1998 | Jensen et al. |
| 5,822,360 A | 10/1998 | Lee et al. |

(Continued)

FOREIGN PATENT DOCUMENTS

WO WO99/45706 * 9/1999

*Primary Examiner*—Daniel Miriam
*Assistant Examiner*—Seyed Azarian
(74) *Attorney, Agent, or Firm*—Lipsitz & McAllister, LLC (57) ABSTRACT

Methods and apparatus are provided for embedding information in a host signal based on the positioning of watermarks within the host signal. An embedder provides (i.e. embeds) a plurality of watermarks in the host signal. A processor associated with the embedder is provided for determining a relative position for embedding of at least two of the plurality of watermarks within the host signal such that the relative position of the watermarks represents the embedded information. The present invention also includes corresponding methods and apparatus for extracting the embedded information from the host signal based on the detected relative positions of the watermarks within the host signal, as well as computer readable medium containing the host signal which carries the embedded information.

165 Claims, 3 Drawing Sheets

U.S. PATENT DOCUMENTS

| | | |
|---|---|---|
| 5,828,325 A | 10/1998 | Wolosewicz et al. |
| 5,832,119 A * | 11/1998 | Rhoads ........................ 382/232 |
| 5,893,067 A | 4/1999 | Bender et al. |
| 5,940,134 A | 8/1999 | Wirtz |
| 5,940,135 A | 8/1999 | Petrovic et al. |
| 5,945,932 A | 8/1999 | Smith et al. |
| 6,061,793 A | 5/2000 | Tewfik et al. |
| 6,233,347 B1 | 5/2001 | Chen et al. |
| 6,282,299 B1 | 8/2001 | Tewfik et al. |
| 6,289,108 B1 | 9/2001 | Rhoads |
| 6,330,335 B1 | 12/2001 | Rhoads |
| 6,363,159 B1 | 3/2002 | Rhoads |
| 6,374,036 B1 | 4/2002 | Ryan et al. |
| 6,381,341 B1 | 4/2002 | Rhoads |
| 6,385,330 B1 | 5/2002 | Powell et al. |
| 6,400,826 B1 * | 6/2002 | Chen et al. .................. 382/100 |
| 6,404,898 B1 | 6/2002 | Rhoads |
| 6,674,876 B1 * | 1/2004 | Hannigan et al. ........... 382/100 |
| 6,768,807 B1 * | 7/2004 | Muratani .................... 382/100 |

* cited by examiner

WATERMARK POSITION MODULATION

This application claims the benefit of U.S. provisional patent application No. 60/290,205 filed on May 11, 2001.

BACKGROUND OF THE INVENTION

The present invention relates generally to digital watermarking of host signals, such as audio signals, video signals, and images. More particularly, the present invention relates to using the relative position of watermarks within a host signal to represent embedded information. Methods and apparatus are provided for embedding the information in the host signal based on the relative position of watermarks within the host signal. Corresponding methods and apparatus are provided for extracting the embedded information from the host signal based on the relative position of watermarks within the host signal. Computer readable medium are provided for carrying a watermarked host signal with the embedded information. The positioning of digital watermarks can be used, for example, to embed copy-control and/or media verification information in an audio or video host signal without degrading the quality of the audio or video output.

A number of distinct prior art watermarking technologies have been proposed and/or patented. These prior art technologies achieve different levels of transparency (fidelity, or non-perceptibility), robustness to standard host-signal processing, tamper resistance, implementation cost, throughput (amount of embedded information), false positive rate, and watermark layering potential.

Watermarks can be used to provide copy control of the original content. For example, copy-control information may be embedded in a host signal so that unauthorized copying of the host signal is prevented. Watermarks can also be used to provide media verification. Media verification watermarks provide information verifying that the content (i.e. of a CD, DVD, or the like) is original content which can be presented for distribution or a copy of the content which cannot be presented for distribution. Media verification also refers to verifying that a user can present entire original content, without any cuts, before a piece of content is copied. Media verification is specifically designed to make distribution of content over the Internet more difficult, for example, by requiring a user to download an entire CD in one piece, even if only one song is desired. Besides copy-control and media verification information, watermarks can carry information that identifies the content, rightful owner, distributor, recipient, and the like.

In all cases, distinct embedded messages are represented by distinct watermarks, i.e. the watermark itself is the vehicle that carries the information.

It would be advantageous to use the position of the watermarks embedded in the host signal as a vehicle that carries embedded information. It would be further advantageous to use the relative position among two or more watermarks as a vehicle that carries the embedded information. It would be further advantageous to provide for the relative positioning of the watermarks to carry information relating to copy-control and media verification.

The methods and apparatus of present invention provide the foregoing and other advantages.

SUMMARY OF THE INVENTION

The present invention relates to methods and apparatus for embedding information in a host signal using the relative position of watermarks within the host signal. The relative position of the watermarks within the host signal represents the embedded information. The present invention also includes corresponding methods and apparatus for extracting the embedded information from the host signal based on the detected relative position of the watermarks within the host signal, as well as computer readable medium containing the host signal which carries the embedded information.

It should be appreciated that the "embedded information" discussed herein is information separate from and in addition to the information carried in the watermarks themselves. It is the relative position between two or more watermarks in the host signal which represents the embedded information.

In one embodiment of the invention, methods and apparatus are provided for embedding information in a host signal based on the positioning of watermarks within the host signal. An embedder provides (i.e. embeds) a plurality of watermarks in the host signal. The embedder may be located, for example, at the source of the host signal (e.g., a video camera, mastering studio, and the like) or at a distribution point for the host signal (e.g., a web portal for content distribution, broadcast stations, and the like). A processor associated with the embedder (also referred to herein as the "first processor" in order to distinguish it from a "second processor" located at for example, a recorder or watermark extractor) is provided for determining a relative position for embedding of at least two of the plurality of watermarks within the host signal such that the relative position of the watermarks represents the embedded information.

Watermark position data for each watermark is provided to the first processor. The first processor calculates respective coordinates of the host signal where each watermark is to be embedded based on the watermark position data. In response to input from the first processor, the embedder embeds each watermark in the host signal at its respective coordinate(s).

The embedded information may be used for copy-control in one of an audio host signal, a video host signal, or an image host signal. Alternatively, the embedded information may be used for media verification in one of an audio host signal or a video host signal.

The watermarks may be positionable anywhere in the host signal. In other words, the watermarks may be positioned at any point in time in an audio host signal and in any point (i.e. spatial coordinate) in an image area for a video or image host signal.

The invention also includes methods and apparatus for extracting embedded information from a watermarked host signal based on the relative position of watermarks in the host signal. A watermark extractor may be provided (e.g., at a recorder) for extracting the plurality of watermarks from a received watermarked host signal. A processor associated with the extractor (referred to herein as a "second processor") detects the positions of the watermarks at the extractor. The second processor can then recover the embedded information based on the relative detected position of the watermarks.

The relative detected position of each watermark at the extractor may be within a maximum error deviation from an original embedded position of the watermark. If the watermark position deviation is outside the maximum error, the embedded information will not be considered valid by the extractor. The watermark extractor may compensate for at least one of time-scale variation or spatial-scale variation when extracting the watermarks.

The embedded information may comprise a conditional copy symbol. The conditional copy signal may comprise one of a no-copy signal, a pay-to-copy signal, a contract-to-copy signal, a register-to-copy signal, or the like. The embedded information may also enable generational copy control (i.e. controlling the making of copies from copies). Generational copy control may be enabled at the extractor, where, for example, the watermark extractor extracts the plurality of watermarks from the host signal and the second processor remarks a first generation copy of the host signal with a no-copy watermark. Therefore, no additional copies of the host signal can be made from the first generation copy.

The embedded information may also comprise media verification information indicating the entire length of an original medium. The original medium may comprise one of a CD or a DVD.

In an example embodiment of the invention, the embedded information is a function of a separation between at least two of the watermarks. An original separation between the watermarks may be defined by:

$$t_b - t_a = T + 4\Delta m$$

wherein $t_a$ denotes a position of a first watermark as embedded in the host signal, $t_b$ denotes a position of a second watermark as embedded in the host signal, T denotes a predefined constant, $\Delta$ denotes a maximum error in watermark position detection, and m denotes a value of an information symbol to be embedded. The first and second watermarks may be identical in duration. In such a case, T may comprise the duration of the watermark. The symbol m may represent any positive integer.

In an example embodiment, a measured separation of the watermark at the extractor, $t'_b - t'_a$, is bounded by:

$$T + 4\Delta m - 2\Delta m < t'_b - t'_a < T + 4\Delta m + 2\Delta m.$$

In such an embodiment, a plurality of non-overlapping $4\Delta$ wide regions centered around $T+4\Delta m$ points are defined for each symbol m having a value of 1, 2, 3, . . . M respectively.

Once the second processor determines the position of the watermarks at the extractor, the second processor may calculate the value of the embedded symbol m based on the position of the watermarks. The value of the embedded symbol m may be provided by:

$$m = \mathrm{round}((t'_b - t'_a - T)/4\Delta).$$

In another example embodiment, the extractor extracts the first watermark and a bit stream of the host signal at each position defined by $t=T+4\Delta m$, $m=1, 2, 3, \ldots$ M. In such an embodiment, the second processor compares the extracted watermark with each extracted bit stream and determines the value of the embedded symbol m based on which extracted bit stream is a best match for the extracted watermark.

The host signal may comprise one of a video signal or an image signal. In such an instance, the separation between the watermarks may be defined by a two dimensional vector. Each vector dimension may correspond to one spatial coordinate. Further, each vector dimension may be used to carry an embedded symbol.

Where the separation between the two watermarks is defined by a two dimensional vector, the relative position of the two watermarks is described by the vector:

$$\vec{v} = (T_x + 4\Delta m_x)\vec{i}_x + (T_y + 4\Delta m_y)\vec{i}_y$$

wherein $i_x$ and $i_y$ are unit vectors along x and y axis respectively, $T_x$ and $T_y$ are predefined constants, $\Delta$ denotes a maximum error in watermark position detection, and $m_x$ and $m_y$ are values of an information signal to be embedded.

Where the host signal is a video signal, the separation between the watermarks may also be defined by a three dimensional vector. Two vector dimensions may correspond respectively to spatial coordinates and one vector dimension may correspond to a time coordinate. Each vector dimension can be used to carry an embedded symbol.

The value of the embedded symbol m may be given by:

$$m = \mathrm{floor}(T_{total}/T_{step})$$

wherein $T_{total}$ denotes the duration of an original medium, $T_{step}$ denotes a predefined time interval, and floor(x) denotes a largest integer which is smaller than or equal to x.

The value of m may indicate media verification information. For example, a zero value of m may indicate that media verification is disabled for the host signal.

The first of the two watermarks may be randomly placed in the host signal so that the first watermark begins during the time interval between a beginning of the host signal and the duration of the watermark.

In a further example embodiment, the second processor may determine the embedded symbol m from a pair of consecutive watermarks. The second processor calculates the nominal position of the watermarks throughout the original medium for media verification purposes. The nominal position of the watermarks $t_w$ may be calculated by:

$$t_w = t_a + i(T + 4\Delta m)$$

wherein i equals 1, 2, 3, . . . , and $t_a$ denotes the position of the first watermark. In such an example embodiment, media verification fails in the event watermarks are detected at a position which varies from the nominal position $t_w$ by more than $+/-2\Delta$.

The extractor may verify the existence of watermarks throughout m $T_{step}$ intervals of the original medium. In such a case, media verification fails in the event that watermarks are not detected at a predetermined number of nominal positions.

The extractor may examine the entire length of the original medium before determining media verification. In such a case, the original medium may be examined at a rate greater than the real time rate of the original medium.

A computer readable medium, which may be for example, a CD or DVD, is provided for carrying the watermarked host signal having embedded information as set forth above. As described above, the watermarked host signal comprises a host signal having a plurality of watermarks embedded therein. A relative position of at least two of the plurality of watermarks within the host signal represents the embedded information.

The embedded information carried in the host signal may be extracted as described above. This embedded information may be used for copy-control. For example, the embedded information may comprise a conditional copy symbol, which may be, for example, a no-copy signal, a pay-to-copy signal, a contract-to-copy signal, or a register-to-copy signal, or the like. The embedded information may also enable generational copy control.

The embedded information may also comprise media verification information regarding the computer readable medium. For example, the embedded information may comprise media verification information indicating the entire length of the computer readable medium.

BRIEF DESCRIPTION OF THE DRAWINGS

FIG. 2 shows an example of watermark positioning for a one dimensional host signal at an embedder (FIG. 2a) and at an extractor (FIG. 2b) in accordance with the invention.

DETAILED DESCRIPTION

The present invention is described in connection with the application of watermarking technology to audio host signals. An example of a watermarking technology that is compatible with the present invention is set forth in U.S. Pat. No. 5,940,135 to Petrovic, et al., entitled "Apparatus and Method for Encoding and Decoding Information in Analog Signals". However, those skilled in the art will appreciate that other watermarking technologies and other types of host signals can be used as well. The basic conditions that need to be met in order to enable watermark position modulation are:

1. At least two watermarks can be embedded into the host signal;
2. The watermark position within the host signal can be arbitrarily set; and
3. The watermark extractor is capable of determining a measure of the watermark position upon the detection of the watermark.

Most watermarking technologies meet the above requirements, including the watermarking technologies described in, for example, U.S. Pat. No. 5,940,135 to Petrovic, U.S. Pat. No. 5,450,490 to Jensen, et al., entitled "Apparatus and Methods for Including Codes in Audio Signals and Decoding", U.S. Pat. No. 5,319,735 to Preuss, et al., entitled "Embedded Signaling", U.S. Pat. No. 5,113,437 to Best, et al., entitled "Signal Identification System", and U.S. Pat. No. 4,876,617 to Best, et al., entitled "Signal Identification", among others. Rare exceptions, such as the watermarking technology described in U.S. Pat. No. 5,473,631 to Moses, entitled "Simultaneous Transmission of Data and Audio Signals by Means of Perceptual Coding", wait for a favorable host signal waveform in order to embed watermarks, and thus do not satisfy condition 2, above.

As an example, U.S. Pat. No. 5,940,135 to Petrovic uses the modulation of a short-term autocorrelation function of a host signal to embed information. In the case of audio host signals, each watermark is typically a few seconds long, so that condition 1 is met for all, except very short, audio pieces. In most instances, the same watermark is repeatedly embedded, so that proper extraction can be done even if only an excerpt of the host signal is presented to the extractor. Further, there are no limitations regarding the positioning of the watermark with such technology (i.e. condition 2 is met).

The watermark itself consists of a string of binary symbols, typically more than one hundred binary symbols. Those skilled in the art will appreciate that the watermark extractor must identify the position of the watermark within a fraction of the bit in order to successfully extract individual bits in the string. As the typical raw bit rate is greater than 20 bps, the timing precision at the extractor should be better than 50 ms. In experiments with the technology described in U.S. Pat. No. 5,940,135 to Petrovic, it has been determined that the watermark position can be established with a precision better than $\Delta=\pm 20$ ms.

It should be noted that Spread Spectrum (SS) watermarking techniques, such as that described in U.S. Pat. No. 5,822,360 to Lee, et al., entitled "Method and Apparatus for Transporting Auxiliary Data in Audio Signals" have even better precision in locating the watermark position. Precision using SS watermarking technology is on the order of a fraction of the chip interval, which is a small fraction of the bit interval.

The watermark position can be measured with respect to some absolute marker, such as the beginning of an audio piece, or a prominent feature of the audio signal. However, this approach is unreliable, since the audio piece can be clipped, and audio features can be distorted during standard signal processing or as a deliberate attack. A well-designed watermark is harder to distort, since it is imperceptible, and its location is hidden. Therefore, in a preferred embodiment of the invention, the relative position among watermarks is used as the information-carrying feature.

Figure 1:
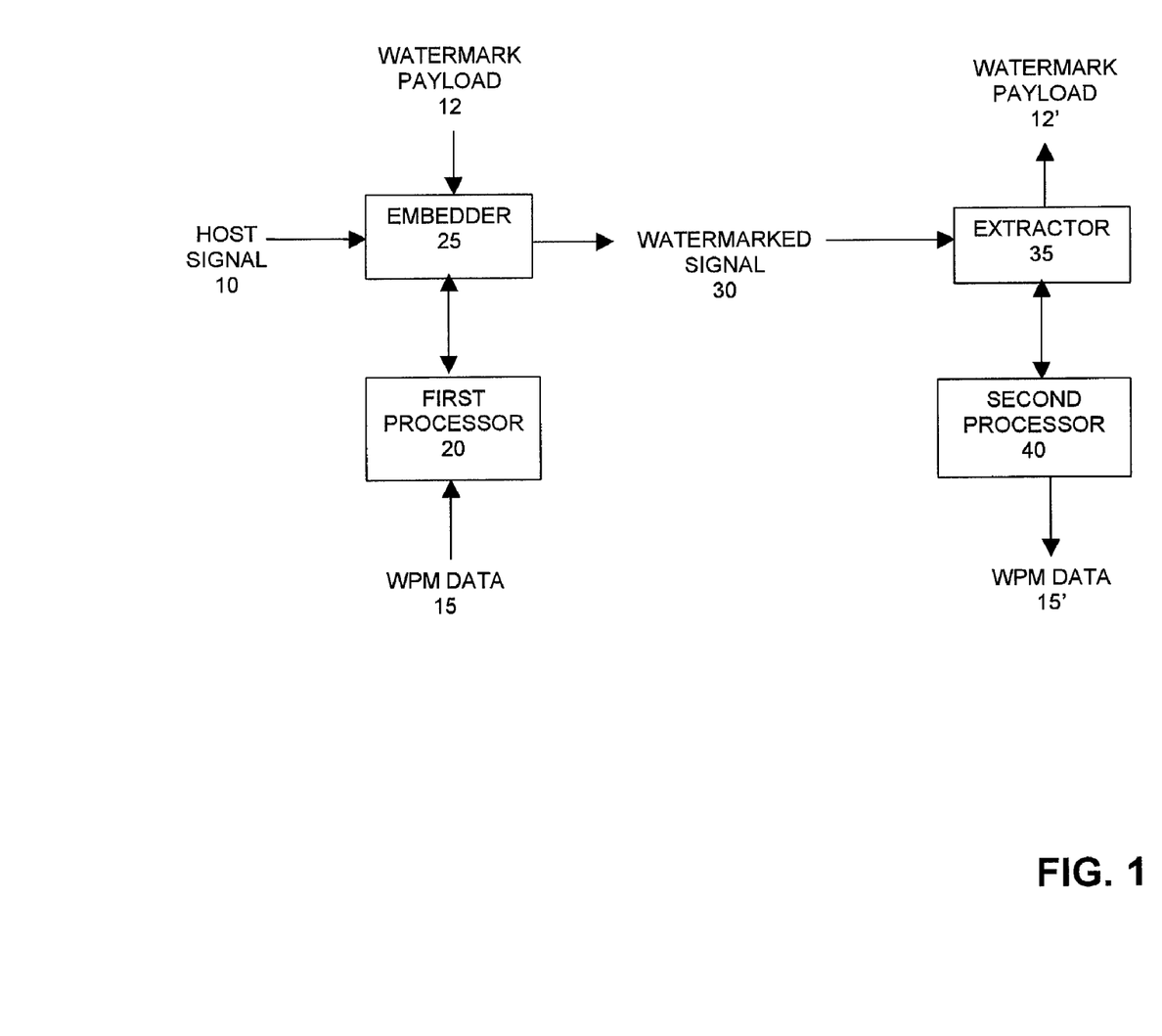
FIG. 1 shows a block diagram of an example embodiment of the invention.

FIG. 1 shows an example embodiment of the invention where additional data is embedded into a host signal 10. Watermark Position Modulation (WPM) data 15 is used to position the usual watermark payload 12 in a host signal 10 by an embedder 25. The embedder 25 may be located, for example, at the source of the host signal 10 or at a distribution point for the host signal 10. A first processor 20 associated with the embedder 25 uses the WPM data 15 to calculate the coordinates of the watermark position. In the case of one-dimensional signals, such as audio signal, the position coordinate may be time, e.g. time offset from the beginning of the music piece to the beginning of the watermarks. Alternatively the beginning of the first embedded watermark may be considered as the origin and coordinates of subsequent watermarks (their start time) are calculated with respect to the origin.

In the case of an image, the coordinates determined using the WPM data 15 could be Cartesian coordinates of the lower, left corner of the watermarks calculated with respect to lower, left corner of the image. Alternative definitions of coordinates for images and video (a three dimensional signal) are obvious to those skilled in the art.

The first processor 20 takes the WPM data 15 as an input and converts it into coordinates of watermarks that are independent of watermark payload 12 or the watermarking technology employed at the embedder 25. The embedder 25 generates (embeds) watermarks that represent the watermarking payload 12 as specified by the particular watermarking technology employed at the embedder, but at the position calculated by the first processor 20 based on WPM data 15 to produce a watermarked signal 30. The relative position of the watermarks within the host signal 10 is used to represent additional data within the host signal 10.

The watermarked signal 30 is presented to extractor 35 after transmission, storage and/or other processing. The extractor 35 may be located, for example, at a recorder. The extractor 35 detects the presence of each watermark and, in association with the second processor 40, determines its location within the watermarked signal 30. This may be done with or without extracting the watermark payload 12'. The location of the watermark at the extractor 35 is expressed using an appropriate coordinate system. For example in the case of audio signals the location could be expressed as the time offset with respect to the beginning of the music piece or with respect to the location of the first watermark. In the case of the images the location could be expressed as the Cartesian coordinates of the lower, left corner of the watermarks calculated with respect to lower, left corner of the image.

The second processor 40 converts the location data into WPM data 15' in the manner disclosed below. The WPM data 15' represents the embedded information determined from the relative position of the watermarks in the watermarked signal 30.

The following is an example of determining the embedded information from the positioning of the watermark. Consider two watermarks, $W_a$ and $W_b$, with the starting positions $t_a$ and $t_b$ respectively. The maximum error in watermark position detection is denoted by $\Delta$, and an information symbol of M-ary alphabet by m. Then, in order to embed the symbol m, the separation between the watermarks is required to be:

$$t_b - t_a = T + 4\Delta m \quad (1)$$

where T is a predefined constant, usually the duration of the watermark.

Because of the uncertainty of the watermark positions at the extractor 35, the measured separation between watermarks, $t'_b - t'_a$, can be larger or smaller than nominal separation by up to $2\Delta$, i.e. the measured separation is bounded by:

$$T + 4\Delta m - 2\Delta m < t'_b - t'_a < T + 4\Delta m + 2\Delta m \quad (2)$$

Non-overlapping, $4\Delta$ wide regions, centered around $T+4\Delta m$ marks, can be defined for each symbol m=1, 2, ..., M.

Figure 2:
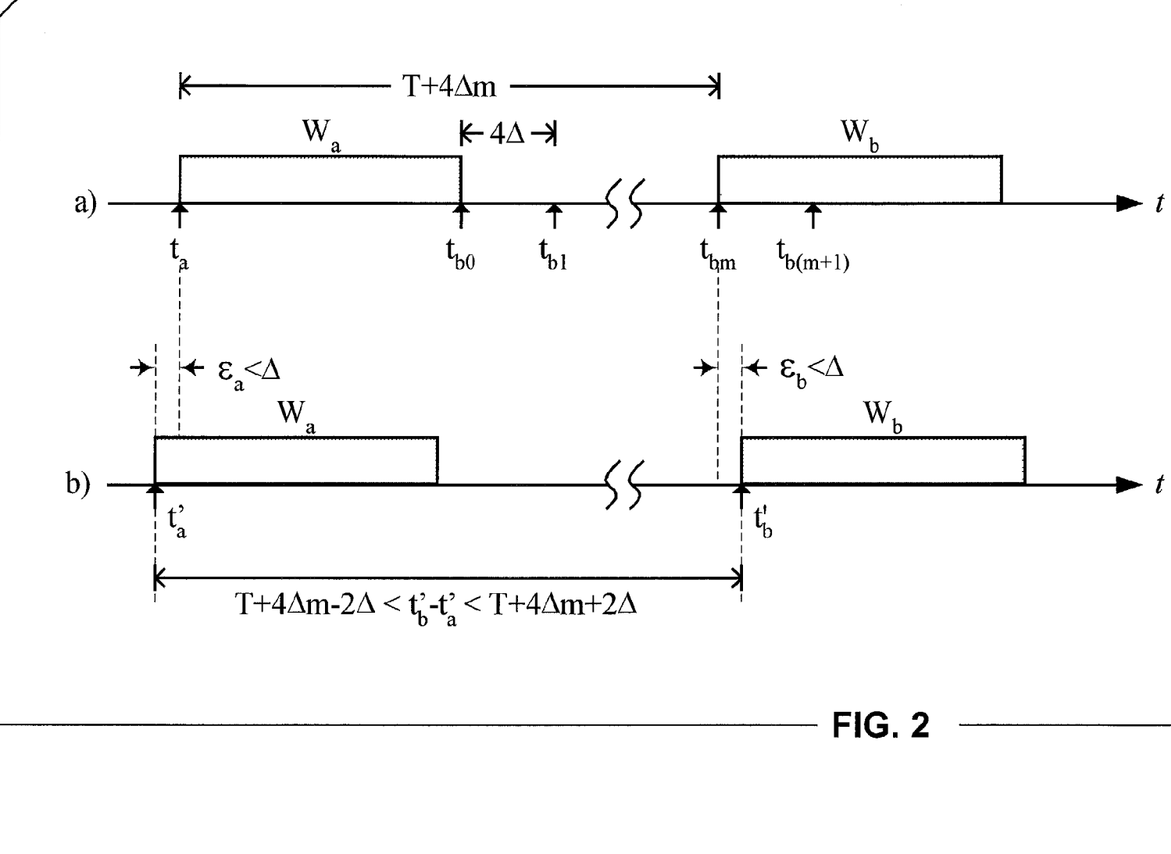

FIG. 2a shows the position of a pair of watermarks at the embedder 25 for a one dimensional host signal 10, with separation given by formula (1). FIG. 2b shows an example of the watermark positions as detected by the extractor 35 for a one dimensional host signal 10. Note that extracted watermarks have offsets from nominal position, $\epsilon_a$ and $\epsilon_b$, that go in opposite directions. However, as long as those offsets are less than maximum $\Delta$, the separation between watermarks is bounded by formula (2) and the correct extraction of the symbol m is possible.

Once a watermark is detected, the extractor 35 can continue to search for the next watermark. Once the extractor 35 locates a pair of watermarks, it can then calculate the separation, $t'_b - t'_a$, and the embedded symbol m, according to the formula:

$$m = \text{round}((t'_b - t'_a - T)/4\Delta) \quad (3)$$

where the operation round(x) rounds the value of x to the nearest integer.

In an alternative embodiment of the invention, once the first watermark is detected, the extractor 35 switches from watermark searching to a watermark matching mode. In the matching mode the extractor correlates the extracted watermark with the extracted bit stream at positions $t=T+4\Delta m$, m=1, 2, ..., M. The best match determines the extracted value of the symbol m. The matching mode allows detection of the watermark reliably even if a number of individual bit mismatches is too numerous for successful watermark data extraction.

In the case of audio watermarks, the separation between the watermarks can be described by a single dimension, i.e. time. However, in the case of watermarking an image, a two dimensional vector can be defined as the watermark separation. Each vector dimension corresponds to one spatial coordinate and can be used to carry a symbol, as described by formula (1) for embedding, and formula (3) for extracting. Similarly, in the case of video watermarking a three-dimensional vector can be used to carry three independent symbols, with two dimensions corresponding to the spatial coordinates and the third dimension corresponding to the time coordinate.

Figure 3:
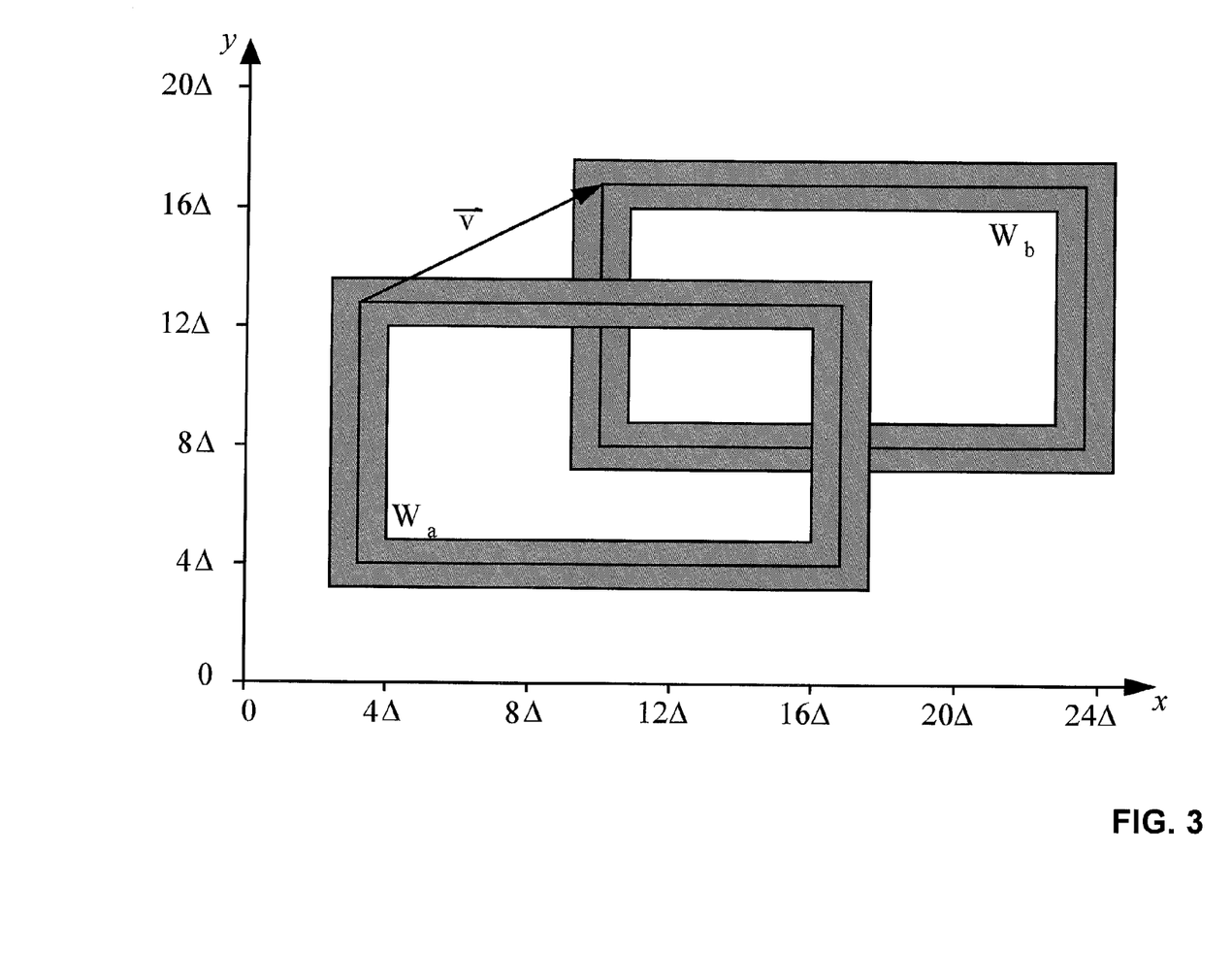
FIG. 3 shows an example of watermark position modulation for a two dimensional host signal.

FIG. 3 illustrates the watermark position modulation in the case of a two dimensional host, such as an image. Two rectangular watermarks $W_a$ and $W_b$ are placed in the image with relative position described by the vector:

$$\vec{v} = (T_x + 4\Delta m_x)\vec{i}_x + (T_y + 4\Delta m_y)\vec{i}_y \quad (4)$$

where $i_x$ and $i_y$ are unit vectors along x and y axis respectively, $T_x$ and $T_y$ are predefined constants, and $m_x$ and $m_y$ are embedded symbols. In the example shown in FIG. 3 constants $T_x = T_y = 0$, and symbols $m_x = 2$ and $m_y = 1$ are used. The shaded regions illustrate possible watermark edge positions obtained by an extractor. Again, the extractor errors should not prevent the correct detection of symbols $m_x$ and $m_y$, as long as the errors are bounded by $\pm\Delta$.

Note that the watermarks in FIG. 3 are partially overlapping. This is a feasible approach as long as the interference between watermarks $W_a$ and $W_b$ is negligible, and the effects of overlapping on transparency are acceptable. The overlapping is needed if the size of the watermark is comparable to the size of the host, and it is impossible to fit the watermarks in disjoint regions of the host.

In some cases, the time scale of an audio signal is varied by a small speed-up or slow-down of the audio, without significantly damaging the audio quality. This can happen due to regular signal processing, such as clock mismatches in analog to digital (A/D) and digital to analog (D/A) converters, tape speed variations, or as a part of an attempt to erase watermarks. The time-scale variation may affect correct extraction of symbols embedded by watermark position modulation.

Similarly, the spatial-scale of a two or three-dimensional host signal may be varied as well, for example, due to image resizing. The extractor 35 must measure the time or spatial scaling in order to properly extract the watermark (or even to detect the presence of the watermark). Once the measure of time or spatial scaling is found in the process of watermark extraction, the same measure can be used to calculate the nominal separation between watermarks for each embedded symbol m. The maximum timing error A should take into account the error that may occur in the time or spatial scaling case.

The watermark position modulation technique of the present invention can be used for copy control and media verification of music, in relation to Secure Digital Music Initiative (SDMI), and DVD audio applications.

Conditional No-Copy Mark

The first generation of SDMI-compatible devices are programmed to detect a no-copy mark embedded in an audio signal and reject its import into a secure environment. Similarly, compliant DVD recorders would reject recording of a signal with an embedded no-copy mark. However, it may be desirable to open some additional possibilities to the users of the second-generation devices, besides cold rejection, while maintaining backward compatibility with the first generation devices.

For example, if a user invests some time to download a music track over the Internet, and then finds that the music is rejected by a compliant device, it may be arranged that the user can still obtain permission to import/copy the track if he or she performs some additional actions (more convenient than repeating the search and the download). For example, the user may register this copy on the Internet, take a debit on his account, and then get a permission to import it into a secure environment or make a copy. Alternatively, the user may have to go though a click-through contract, see some advertisements or solicitations, or the like.

In order to communicate different options to the advanced devices, the position modulation of no-copy watermarks can be used. The first generation devices will not be affected by the separation between watermarks. However, advanced devices would detect the separation, extract the embedded symbol m, and perform straight rejection if m=1, or offer to the user options 2, 3, . . . as communicated by m.

The first generation SDMI devices do not have the capability to change the state of the watermark, i.e. to remark the audio signal with another watermark. Therefore, it is impossible to introduce generational copy control, to allow copying from the original, but not a copy from a copy. However, the next generation of devices may have the ability to remark, and could be allowed to make only a first generation copy from the original. This can be achieved by having no-copy watermarks in both the original and the first generation copies, but with different watermark spacing.

For example, the original may have gaps between the watermarks equal to the watermark length. The first generation devices would reject either of them, since they do not measure the watermark spacing. The remarking device can detect the presence of the gaps between the watermarks in the original signal, and make a copy while embedding new no-copy marks to fill-in the gaps. If the remarking device detects the watermarks with no gaps it will interpret this signal as a copy and reject making copy from a copy.

Media Verification

In order to reduce piracy of music over the Internet, SDMI is considering techniques that verify if the user can present an original medium for music distribution, such as a CD or DVD, before allowing a track to be imported into compliant devices. The objective is to prevent typical piracy, where users download individual songs from the Internet. It is assumed that downloading the whole CD in order to rip off a single track is too much of an inconvenience for most casual "pirates". This concept is not novel, and others have proposed their own solution to this problem.

The solutions for media verification are proposed for phase II SDMI devices, while phase I devices already have extractors (a.k.a. screens) for a copy-control watermarks, with no detection of the watermark spacing. All of the proposed and prior art media verification solutions so far involve embedding some additional information into the audio, in addition to the phase I watermarks. The present invention enables media verification using watermark position modulation as described above, without the need for embedding of extra information. The invention therefore improves the transparency of the watermarks, as wells as robustness and security. The present invention also reduces the complexity of phase II extractors.

The phase I watermarks are currently embedded continuously, i.e. the spacing between watermarks is equal to the length of the watermark itself, T. This corresponds to m=0 in the formula (1), and signifies no media verification. In order to enable the media verification, the watermarks should be embedded with the spacing as defined by formula (1), and m=1, 2, . . . , M. It should be noted that the phase I SDMI watermark also contains a "trigger" bit, which could also allow the extractor to distinguish whether to perform media verification or not. For example, it can be specified that if trigger bit is in the state 0, media verification is disabled, and if the trigger bit is 1, the media verification is enabled. However, it may be desirable to leave open the possibility to have the trigger bit set to 1 and still disable media verification by having m=0.

The value of the embedded symbol m should be used to carry the information about the length of the music on the original medium (e.g., from the beginning of the first track to the end of the last track). For example, the value of m can be calculated according to:

$$m = \text{floor}\left(\frac{T_{total}}{T_{step}}\right) \quad (5)$$

where $T_{total}$ denotes duration of the original music, $T_{step}$ is a predefined time interval (e.g. $T_{step}$=10 min), and floor(x) denotes the largest integer smaller than or equal to x (i.e. floor(x) is a rounding down operation). When $T_{total} < T_{step}$ the obtained value for m is zero, which means that the media verification is disabled. However, if the music on the original medium is too short, it is not too difficult to copy and transfer the whole content over the Internet anyway, and there is no point in having media verification.

During the production of a CD, DVD, or other original medium, the total audio content should be assembled (including spaces between tracks), and its duration measured. Next, the symbol m should be calculated according to formula (5), and the phase I watermarks should be embedded throughout the assembled content, with the spacing between successive watermarks defined by (1). However, the beginning of the first watermark should be randomly placed somewhere on the time interval (0, T), where 0 corresponds to the beginning of the first track, and T is the duration of the watermark.

The phase II extractor (e.g., extractor 35) with watermark position detection should extract the symbol m from a pair of consecutive watermarks, and detect the position of the first watermark, $t_a$. Then the extractor 35 can calculate the nominal position of watermarks throughout the original medium:

$$t_w = t_a + i(T+4\Delta m), \ i=1, 2, 3, \quad (6)$$

The media verification should fail and the content should be rejected if watermarks are detected with a position different than that defined in formula (6) by more than the maximum tolerance ±2Δ. Note that an attempt to assemble tracks from various media and present it as an original production will inevitably result in violation of the watermark periodicity (heart-beat rule) expressed by formula (6). Even if the individual tracks have the same position with the respect to the beginning of the medium, and come from the medium with nearly the same duration (the same m), the periodicity will be violated still because of the random starting position of the watermarks.

Further, the extractor 35 should verify the existence of the watermarks throughout m $T_{step}$ intervals. However, a failure to detect an individual watermark is not a sufficient reason to reject the content. Some watermarks may be undetectable because they coincide with a silence interval, or some other unfavorable audio. The content should be rejected only if the failure to detect watermarks becomes too frequent. For example, for technology of U.S. Pat. No. 5,940,135 to Petrovic, the failure to detect more than 5% of watermarks can be used as a good enough reason to reject the content.

In some cases, it is necessary to examine the whole music content continuously before the permission to import may be granted. For example, if the imported music comes through an analog port it is necessary to examine m $T_{step}$ intervals to be sure that the user has the entire audio content. However, this examination is not necessarily done in real time, i.e. it is possible to play the content at a much higher speed than the real time rate of the original medium while doing the examination.

In the case of random access mediums, such as CDs and DVDs, it is possible for the extractor 35 to examine the music at selected time intervals only.

It should now be appreciated that the present invention provides advantageous methods and apparatus for carrying embedded information in a host signal using the positioning of watermarks within the host signal.

Although the invention has been described in connection with various illustrated embodiments, numerous modifications and adaptations may be made thereto without departing from the spirit and scope of the invention as set forth in the claims.

What is claimed is:

1. A method for embedding information in a host signal, comprising the steps of:
    providing a plurality of watermarks in at least partially non-overlapping regions of the host signal, said watermarks comprising information representing logical values; and
    using a relative position of at least two of said plurality of watermarks within the host signal to represent the embedded information.

2. A method in accordance with claim 1, further comprising:
    providing watermark position data for each watermark;
    calculating respective coordinates of the host signal where each watermark is to be embedded based on said watermark position data; and
    embedding each watermark at its respective coordinate.

3. A method in accordance with claim 1, wherein:
    the embedded information is used for copy-control in one of an audio host signal, a video host signal, or an image host signal.

4. A method in accordance with claim 1, wherein:
    the embedded information is used for media verification in one of an audio host signal or a video host signal.

5. A method in accordance with claim 1, wherein:
    the watermarks are positionable anywhere in the host signal.

6. A method in accordance with claim 1, further comprising:
    detecting the positions of the watermarks at a watermark extractor; and
    recovering the embedded information based on the relative detected position of the watermarks.

7. A method in accordance with claim 6, wherein:
    the relative detected position of each watermark at the extractor is within a maximum error deviation from an original embedded position of said watermark.

8. A method in accordance with claim 1, wherein:
    the watermarks are extracted at an extractor; and
    said extractor compensates for at least one of time-scale variation or spatial-scale variation when extracting the watermarks.

9. A method in accordance with claim 1, wherein:
    the embedded information comprises a conditional copy symbol.

10. A method in accordance with claim 9, wherein:
    the conditional copy symbol comprises one of a no-copy signal, a pay-to-copy signal, a contract-to-copy signal, or a register-to-copy signal.

11. A method in accordance with claim 1, wherein:
    the embedded information enables generational copy control.

12. A method in accordance with claim 11, further comprising:
    remarking a first generation copy with a no-copy watermark.

13. A method in accordance with claim 1, wherein:
    the embedded information comprises media verification information indicating the entire length of an original medium.

14. A method in accordance with claim 13, wherein:
    the original medium comprises one of a CD or a DVD.

15. A method in accordance with claim 1, wherein:
    the embedded information is a function of a separation between at least two of said watermarks.

16. A method in accordance with claim 15, wherein:
    an original separation between said watermarks is defined by:

$$t_b - t_a = T + 4\Delta m$$

wherein:
    $t_a$ denotes a position of a first watermark as embedded in the host signal;
    $t_b$ denotes a position of a second watermark as embedded in the host signal;
    T denotes a predefined constant;
    $\Delta$ denotes a maximum error in watermark position detection; and
    m denotes a value of a symbol representing said embedded information.

17. A method in accordance with claim 16, wherein:
    the first and second watermarks are identical in duration; and
    T comprises the duration of the watermark.

18. A method in accordance with claim 16, wherein:
    m is any positive integer.

19. A method in accordance with claim 16, wherein:
    a measured separation of the watermark at an extractor, $t'_b - t'_a$, is bounded by:

$$T + 4\Delta m - 2\Delta m < t'_b - t'_a < T + 4\Delta m + 2\Delta m.$$

20. A method in accordance with claim 19, wherein:
    a plurality of non-overlapping $4\Delta$ wide regions centered around $T + 4\Delta m$ points are defined for each symbol m having a value of 1, 2, 3, . . . M respectively.

21. A method in accordance with claim 16, further comprising:
    determining the position of the watermarks at an extractor; and
    calculating the value of the embedded symbol m based on the position of the watermarks.

22. A method in accordance with claim 21, wherein:
    the value of the embedded symbol m is provided by:

$$m = \text{round}((t'_b - t'_a - T)/4\Delta).$$

23. A method in accordance with claim 16, further comprising:
    extracting the first watermark at an extractor;
    extracting a bit stream of the host signal at each position defined by $t = T + 4\Delta m$, m=1, 2, 3, . . . M; and
    comparing the extracted watermark with each extracted bit stream; and
    determining the value of the embedded symbol m based on which extracted bit stream is a best match for the extracted watermark.

24. A method in accordance with claim 15, wherein:
    the host signal comprises one of a video signal or an image signal; and the separation between the watermarks is defined by a two dimensional vector.

25. A method in accordance with claim 24, wherein:
each vector dimension corresponds to one spatial coordinate; and
each vector dimension can be used to carry an embedded symbol.

26. A method in accordance with claim 25, wherein:
the relative position of the two watermarks is described by the vector:

$$\vec{v} = (T_x + 4\Delta m_x)\vec{i}_x + (T_y + 4\Delta m_y)\vec{i}_y$$

wherein:
$i_x$ and $i_y$ are unit vectors along x and y axis respectively;
$T_x$ and $T_y$ are predefined constants;
$\Delta$ denotes a maximum error in watermark position detection; and
$m_x$ and $m_y$ are values of an information signal to be embedded.

27. A method in accordance with claim 15, wherein:
the host signal is a video signal; and
the separation between the watermarks is defined by a three dimensional vector.

28. A method in accordance with claim 27, wherein:
two vector dimensions correspond respectively to spatial coordinates;
one vector dimension corresponds to a time coordinate; and
each vector dimension can be used to carry an embedded symbol.

29. A method in accordance with claim 16, wherein:
the value of the embedded symbol m is given by:

$$m = \text{floor}(T_{total}/T_{step})$$

wherein:
$T_{total}$ denotes the duration of an original medium;
$T_{step}$ denotes a predefined time interval; and
floor(x) denotes a largest integer which is smaller than or equal to x.

30. A method in accordance with claim 29, wherein:
the value of m indicates media verification information.

31. A method in accordance with claim 30, wherein:
a zero value of m indicates that media verification is disabled for the host signal.

32. A method in accordance with claim 29, wherein:
a first of said two watermarks is randomly placed in the host signal so that said first watermark begins during the time interval between a beginning of the host signal and the duration of the watermark.

33. A method in accordance with claim 29, further comprising:
determining a position of a first watermark;
determining the embedded symbol m from a pair of consecutive watermarks; and
calculating the nominal position of the watermarks throughout the original medium for media verification purposes.

34. A method in accordance with claim 33, wherein:
the nominal position of the watermarks $t_w$ is calculated by:

$$t_w = t_a + i(T + 4\Delta m)$$

wherein:
i equals 1, 2, 3, . . . ; and
$t_a$ denotes the position of the first watermark.

35. A method in accordance with claim 34, wherein:
media verification fails in the event watermarks are detected at a position which varies from the nominal position $t_w$ by more than +/−2$\Delta$.

36. A method in accordance with claim 34, wherein:
the extractor verifies the existence of watermarks throughout m Tstep intervals of the original medium.

37. A method in accordance with claim 34, wherein:
media verification fails in the event that watermarks are not detected at a predetermined number of nominal positions.

38. A method in accordance with claim 34, wherein:
the extractor examines the entire length of the original medium before determining media verification.

39. A method in accordance with claim 38, wherein:
the original medium is examined at a rate greater than the real time rate of the original medium.

40. A method for extracting embedded information from a host signal having a plurality of watermarks, comprising the steps of:
detecting the positions of at least two of the watermarks at a watermark extractor; and
recovering the embedded information based on the relative detected position of the watermarks, wherein:
said watermarks are provided in at least partially non-overlapping regions of the host signal; and
said watermarks comprise information representing logical values.

41. A method in accordance with claim 40, wherein:
the embedded information is used for copy-control in one of an audio host signal, a video host signal, or an image host signal.

42. A method in accordance with claim 40, wherein:
the embedded information is used for media verification in one of an audio host signal or a video host signal.

43. A method in accordance with claim 40, wherein:
the watermarks are positionable anywhere in the host signal.

44. A method in accordance with claim 40, wherein:
the position detected at the extractor for each watermark is within a maximum error deviation from an original embedded position of said watermark.

45. A method in accordance with claim 40, wherein:
said extractor compensates for at least one of time-scale variation or spatial-scale variation when extracting the watermarks.

46. A method in accordance with claim 40, wherein:
the embedded information comprises a conditional copy symbol.

47. A method in accordance with claim 46, wherein:
the conditional copy symbol comprises one of a no-copy signal, a pay-to-copy signal, a contract-to-copy signal, or a register-to-copy signal.

48. A method in accordance with claim 40, wherein:
the embedded information enables generational copy control.

49. A method in accordance with claim 48, further comprising:
remarking a first generation copy with a no-copy watermark.

50. A method in accordance with claim 40, wherein:
the embedded information comprises media verification information indicating the entire length of an original medium.

51. A method in accordance with claim 50, wherein:
the original medium comprises one of a CD or a DVD.

52. A method in accordance with claim 40, wherein:
the embedded information is a function of a separation between at least two of said watermarks.

53. A method in accordance with claim 52, wherein:
an original separation between said watermarks is defined by:

$$t_b - t_a = T + 4\Delta m$$

wherein:
- $t_a$ denotes a position of a first watermark as embedded in the host signal;
- $t_b$ denotes a position of a second watermark as embedded in the host signal;
- T denotes a predefined constant;
- $\Delta$ denotes a maximum error in watermark position detection; and
- m denotes a value of a symbol representing said embedded information.

54. A method in accordance with claim 53, wherein:
the first and second watermarks are identical in duration; and
T comprises the duration of the watermark.

55. A method in accordance with claim 53, wherein:
m is any positive integer.

56. A method in accordance with claim 53, wherein:
a measured separation of the watermark at an extractor, $t'_b - t'_a$, is bounded by:

$$T + 4\Delta m - 2\Delta m < t'_b - t'_a < T + 4\Delta m + 2\Delta m.$$

57. A method in accordance with claim 56, wherein:
a plurality of non-overlapping $4\Delta$ wide regions centered around $T + 4\Delta m$ points are defined for each symbol m having a value of 1, 2, 3, ... M respectively.

58. A method in accordance with claim 53, further comprising:
calculating the value of the embedded symbol m based on the position of the watermarks.

59. A method in accordance with claim 58, wherein:
the value of the embedded symbol m is provided by:

$$m = \text{round}((t'_b - t'_a - T)/4\Delta).$$

60. A method in accordance with claim 53, further comprising:
extracting the first watermark at an extractor;
extracting a bit stream of the host signal at each position defined by $t = T + 4\Delta m$, m=1, 2, 3, ... M; and
comparing the extracted watermark with each extracted bit stream; and
determining the value of the embedded symbol m based on which extracted bit stream is a best match for the extracted watermark.

61. A method in accordance with claim 52, wherein:
the host signal comprises one of a video signal or an image signal; and
the separation between the watermarks is defined by a two diniensional vector.

62. A method in accordance with claim 61, wherein:
each vector dimension corresponds to one spatial coordinate; and
each vector dimension can be used to carry an embedded symbol.

63. A method in accordance with claim 62, wherein:
the relative position of the two watermarks is described by the vector:

$$\vec{v} = (T_x + 4\Delta m_x)\vec{i}_x + (T_y + 4\Delta m_y)\vec{i}_y$$

wherein:
- $i_x$ and $i_y$ are unit vectors along x and y axis respectively;
- $T_x$ and $T_y$ are predefined constants;
- $\Delta$ denotes a maximum error in watermark position detection; and
- $m_x$ and $m_y$ are values of an information signal to be embedded.

64. A method in accordance with claim 52, wherein:
the host signal is a video signal; and
the separation between the watermarks is defined by a three dimensional vector.

65. A method in accordance with claim 64, wherein:
two vector dimensions correspond respectively to spatial coordinates;
one vector dimension corresponds to a time coordinate; and
each vector dimension can be used to carry an embedded symbol.

66. A method in accordance with claim 53, wherein:
the value of the embedded symbol m is given by:

$$m = \text{floor}(T_{total}/T_{step})$$

wherein:
- $T_{total}$ denotes the duration of an original medium;
- $T_{step}$ denotes a predefined time interval; and
- floor(x) denotes a largest integer which is smaller than or equal to x.

67. A method in accordance with claim 66, wherein:
the value of m indicates media verification information.

68. A method in accordance with claim 67, wherein:
a zero value of m indicates that media verification is disabled for the host signal.

69. A method in accordance with claim 66, wherein:
a first of said two watermarks is randomly placed in the host signal so that said first watermark begins during the time interval between a beginning of the host signal and the duration of the watermark.

70. A method in accordance with claim 66, further comprising:
determining a position of a first watermark;
determining the embedded symbol m from a pair of consecutive watermarks; and
calculating the nominal position of the watermarks throughout the original medium for media verification purposes.

71. A method in accordance with claim 70, wherein:
the nominal position of the watermarks $t_w$ is calculated by:

$$t_w = t_a + i(T + 4\Delta m)$$

wherein:
- i equals 1, 2, 3, ... ; and
- $t_a$ denotes the position of the first watermark.

72. A method in accordance with claim 71, wherein:
media verification fails in the event watermarks are detected at a position which varies from the nominal position $t_w$ by more than $+/-2\Delta$.

73. A method in accordance with claim 71, wherein:
the extractor verifies the existence of watermarks throughout m $T_{step}$ intervals of the original medium.

74. A method in accordance with claim 71, wherein:
media verification fails in the event that watermarks are not detected at a predetermined number of nominal positions.

75. A method in accordance with claim 71, wherein:
the extractor examines the entire length of the original medium before determining media verification.

76. A method in accordance with claim 75, wherein:
the original medium is examined at a rate greater than the real time rate of the original medium.

77. Apparatus for embedding information in a host signal, comprising:

an embedder capable of providing a plurality of watermarks in at least partially non-overlapping regions of the host signal, said watermarks comprising information representing logical values; and a first processor capable of determining a relative position of at least two of said plurality of watermarks within the host signal such that said relative position represents the embedded information.

78. Apparatus in accordance with claim 77, wherein:
watermark position data for each watermark is provided to said first processor;
said first processor calculates respective coordinates of the host signal where each watermark is to be embedded based on said watermark position data; and
said embedder embeds each watermark at its respective coordinate.

79. Apparatus in accordance with claim 77, wherein:
the embedded information is used for copy-control in one of an audio host signal, a video host signal, or an image host signal.

80. Apparatus in accordance with claim 77, wherein:
the embedded information is used for media verification in one of an audio host signal or a video host signal.

81. Apparatus in accordance with claim 77, wherein:
the watermarks are positionable anywhere in the host signal.

82. Apparatus in accordance with claim 77, further comprising:
a watermark extractor capable of extracting said plurality of watermarks; and
a second processor capable of detecting the positions of the watermarks at the extractor, wherein said second processor recovers the embedded information based on the relative detected position of the watermarks.

83. Apparatus in accordance with claim 82, wherein:
the relative detected position of each watermark at the extractor is within a maximum error deviation from an original embedded position of said watermark.

84. Apparatus in accordance with claim 77, further comprising:
a watermark extractor capable of extracting the plurality of watermarks, wherein said extractor compensates for at least one of time-scale variation or spatial-scale variation when extracting the watermarks.

85. Apparatus in accordance with claim 77, wherein:
the embedded information comprises a conditional copy symbol.

86. Apparatus in accordance with claim 85, wherein:
the conditional copy symbol comprises one of a no-copy signal, a pay-to-copy signal, a contract-to-copy signal, or a register-to-copy signal.

87. Apparatus in accordance with claim 77, wherein:
the embedded information enables generational copy control.

88. Apparatus in accordance with claim 87, further comprising:
a watermark extractor capable of extracting said plurality of watermarks from said host signal;
a second processor capable of remarking a first generation copy with a no-copy watermark.

89. Apparatus in accordance with claim 77, wherein:
the embedded information comprises media verification information indicating the entire length of an original medium.

90. Apparatus in accordance with claim 89, wherein:
the original medium comprises one of a CD or a DVD.

91. Apparatus in accordance with claim 77, wherein:
the embedded information is a function of a separation between at least two of said watermarks.

92. Apparatus in accordance with claim 91, wherein:
an original separation between said watermarks is defined by:

$$t_b - t_a = T + 4\Delta m$$

wherein:
$t_a$ denotes a position of a first watermark as embedded in the host signal;
$t_b$ denotes a position of a second watermark as embedded in the host signal;
T denotes a predefined constant;
$\Delta$ denotes a maximum error in watermark position detection; and
m denotes a value of a symbol representing said embedded information.

93. Apparatus in accordance with claim 92, wherein:
the first and second watermarks are identical in duration; and
T comprises the duration of the watermark.

94. Apparatus in accordance with claim 92, wherein:
m is any positive integer.

95. Apparatus in accordance with claim 92, wherein:
a measured separation of the watermark at an extractor, $t'_b - t'_a$, is bounded by:

$$T+4\Delta m - 2\Delta m < t'_b - t'_a < T+4\Delta m + 2\Delta m.$$

96. Apparatus in accordance with claim 95, wherein:
a plurality of non-overlapping $4\Delta$ wide regions centered around $T+4\Delta m$ points are defined for each symbol m having a value of 1, 2, 3, . . . M respectively.

97. Apparatus in accordance with claim 92, further comprising:
a watermark extractor capable of extracting said plurality of watermarks;
a second processor capable of determining the position of the watermarks at the extractor, wherein said second processor calculates the value of the embedded symbol m based on the position of the watermarks.

98. Apparatus in accordance with claim 97, wherein:
the value of the embedded symbol m is provided by:

$$m = \text{round}((t'_b - t'_a - T)/4\Delta).$$

99. Apparatus in accordance with claim 92, further comprising:
an extractor capable of extracting the first watermark and for extracting a bit stream of the host signal at each position defined by $t = T + 4\Delta m$, m=1, 2, 3, . . . M; and
a second processor capable of comparing the extracted watermark with each extracted bit stream and determining the value of the embedded symbol m based on which extracted bit stream is a best match for the extracted watermark.

100. Apparatus in accordance with claim 91, wherein:
the host signal comprises one of a video signal or an image signal; and
the separation between the watermarks is defined by a two dimensional vector.

101. Apparatus in accordance with claim 100, wherein:
each vector dimension corresponds to one spatial coordinate; and
each vector dimension can be used to carry an embedded symbol.

102. Apparatus in accordance with claim 101, wherein:
the relative position of the two watermarks is described by the vector:

$$\vec{v} = (T_x + 4\Delta m_x)\vec{i}_x + (T_y + 4\Delta m_y)\vec{i}_y$$

wherein:
$i_x$ and $i_y$ are unit vectors along x and y axis respectively;
$T_x$ and $T_y$ are predefined constants;
$\Delta$ denotes a maximum error in watermark position detection; and
$m_x$ and $m_y$ are values of an information signal to be embedded.

103. Apparatus in accordance with claim 91, wherein:
the host signal is a video signal; and
the separation between the watermarks is defined by a three dimensional vector.

104. Apparatus in accordance with claim 103, wherein:
two vector dimensions correspond respectively to spatial coordinates;
one vector dimension corresponds to a time coordinate; and
each vector dimension can be used to carry an embedded symbol.

105. Apparatus in accordance with claim 92, wherein:
the value of the embedded symbol m is given by:

$$m = \text{floor}(T_{total}/T_{step})$$

wherein:
$T_{total}$ denotes the duration of an original medium;
$T_{step}$ denotes a predefined time interval; and
floor(x) denotes a largest integer which is smaller than or equal to x.

106. Apparatus in accordance with claim 105, wherein:
the value of m indicates media verification information.

107. Apparatus in accordance with claim 106, wherein:
a zero value of m indicates that media verification is disabled for the host signal.

108. Apparatus in accordance with claim 105, wherein:
a first of said two watermarks is randomly placed in the host signal so that said first watermark begins during the time interval between a beginning of the host signal and the duration of the watermark.

109. Apparatus in accordance with claim 105, further comprising:
a watermark extractor capable of extracting said plurality of watermarks;
a second processor capable of determining a position of a first watermark at said extractor, wherein;
said second processor determines the embedded symbol m from a pair of consecutive watermarks; and
said second processor calculates the nominal position of the watermarks throughout the original medium for media verification purposes.

110. Apparatus in accordance with claim 109, wherein:
the nominal position of the watermarks $t_w$ is calculated by:

$$t_w = t_a + i(T + 4\Delta m)$$

wherein:
i equals 1, 2, 3, . . . ; and
$t_a$ denotes the position of the first watermark.

111. Apparatus in accordance with claim 110, wherein:
media verification fails in the event watermarks are detected at a position which varies from the nominal position $t_w$ by more than $+/-2\Delta$.

112. Apparatus in accordance with claim 110, wherein:
the extractor verifies the existence of watermarks throughout m $T_{step}$ intervals of the original medium.

113. Apparatus in accordance with claim 110, wherein:
media verification fails in the event that watermarks are not detected at a predetermined number of nominal positions.

114. Apparatus in accordance with claim 110, wherein:
the extractor examines the entire length of the original medium before determining media verification.

115. Apparatus in accordance with claim 114, wherein:
the original medium is examined at a rate greater than the real time rate of the original medium.

116. Apparatus for extracting embedded information from a host signal having a plurality of watermarks, comprising:
an extractor capable of detecting the positions of at least two of the watermarks at a watermark extractor; and
a processor capable of recovering the embedded information based on the relative detected position of the watermarks, wherein:
said watermarks are provided in at least partially non-overlapping regions of the host signal; and
said watermarks comprise information representing logical values.

117. Apparatus in accordance with claim 116, wherein:
the embedded information is used for copy-control in one of an audio host signal, a video host signal, or an image host signal.

118. Apparatus in accordance with claim 116, wherein:
the embedded information is used for media verification in one of an audio host signal or a video host signal.

119. Apparatus in accordance with claim 116, wherein:
the watermarks are positionable anywhere in the host signal.

120. Apparatus in accordance with claim 116, wherein:
the position detected at the extractor for each watermark is within a maximum error deviation from an original embedded position of said watermark.

121. Apparatus in accordance with claim 116, wherein:
said extractor compensates for at least one of time-scale variation or spatial-scale variation when extracting the watermarks.

122. Apparatus in accordance with claim 116, wherein:
the embedded information comprises a conditional copy symbol.

123. Apparatus in accordance with claim 122, wherein:
the conditional copy signal symbol comprises one of a no-copy signal, a pay-to-copy signal, a contract-to-copy signal, or a register-to-copy signal.

124. Apparatus in accordance with claim 116, wherein:
the embedded information enables generational copy control.

125. Apparatus in accordance with claim 124, wherein:
said processor remarks a first generation copy with a no-copy watermark.

126. Apparatus in accordance with claim 116, wherein:
the embedded information comprises media verification information indicating the entire length of an original medium.

127. Apparatus in accordance with claim 126, wherein:
the original medium comprises one of a CD or a DVD.

128. Apparatus in accordance with claim 116, wherein:
the embedded information is a function of a separation between at least two of said watermarks.

129. Apparatus in accordance with claim 128, wherein:
an original separation between said watermarks is defined by:

$$t_b - t_a = T + 4\Delta m$$

wherein:
$t_a$ denotes a position of a first watermark as embedded in the host signal;

$t_b$ denotes a position of a second watermark as embedded in the host signal;

T denotes a predefined constant;

Δ denotes a maximum error in watermark position detection; and m denotes a value of a symbol representing said embedded information.

130. Apparatus in accordance with claim 129, wherein:
the first and second watermarks are identical in duration; and T comprises the duration of the watennark.

131. Apparatus in accordance with claim 129, wherein:
m is any positive integer.

132. Apparatus in accordance with claim 129, wherein:
a measured separation of the watermark at an extractor, $t'_b - t'_a$, is bounded by:

$$T+4\Delta m-2\Delta m < t'_b - t'_a < T+4\Delta m+2\Delta m.$$

133. Apparatus in accordance with claim 132, wherein:
a plurality of non-overlapping 4Δ wide regions centered around T+4Δm points are defined for each symbol m having a value of 1, 2, 3, . . . M respectively.

134. Apparatus in accordance with claim 129, wherein:
said processor calculates the value of the embedded symbol m based on the position of the watermarks.

135. Apparatus in accordance with claim 134, wherein:
the value of the embedded symbol m is provided by:

$$m = \text{round}((t'_b - t'_a - T)/4\Delta).$$

136. Apparatus in accordance with claim 129, wherein:
said extractor extracts the first;

said extractor extracts a bit stream of the host signal at each position defined by t=T+4Δm, m=1,2,3, . . . M; and said processor compares the extracted watermark with each extracted bit stream; and said processor determines the value of the embedded symbol m based on which extracted bit stream is a best match for the extracted watermark.

137. Apparatus in accordance with claim 128, wherein:
the host signal comprises one of a video signal or an image signal; and the separation between the watermarks is defined by a two dimensional vector.

138. Apparatus in accordance with claim 137, wherein:
each vector dimension corresponds to one spatial coordinate; and each vector dimension can be used to carry an embedded symbol.

139. Apparatus in accordance with claim 138, wherein:
the relative position of the two watermarks is described by the vector:

$$\vec{v} = (T_x + 4\Delta m_x)\vec{i}_x + (T_y + 4\Delta m_y)\vec{i}_y$$

wherein:

$\vec{i}_x$ and $\vec{i}_y$ are unit vectors along x and y axis respectively;

$T_x$ and $T_y$ are predefined constants;

Δ denotes a maximum error in watermark position detection; and $m_x$ and $m_y$ are values of an information signal to be embedded.

140. Apparatus in accordance with claim 128, wherein:
the host signal is a video signal; and the separation between the watermarks is defined by a three dimensional vector.

141. Apparatus in accordance with claim 140, wherein:
two vector dimensions correspond respectively to spatial coordinates;

one vector dimension corresponds to a time coordinate; and each vector dimension can be used to carry an embedded symbol.

142. Apparatus in accordance with claim 129, wherein:
the value of the embedded symbol m is given by:

$$m = \text{floor}(T_{total}/T_{step})$$

wherein:

$T_{total}$ denotes the duration of an original medium;

$T_{step}$ denotes a predefined time interval; and floor(x) denotes a largest integer which is smaller than or equal to x.

143. Apparatus in accordance with claim 142, wherein:
the value of m indicates media verification information.

144. Apparatus in accordance with claim 143, wherein:
a zero value of m indicates that media verification is disabled for the host signal.

145. Apparatus in accordance with claim 142, wherein:
a first of said two watermarks is randomly placed in the host signal so that said first watermark begins during the time interval between a beginning of the host signal and the duration of the watermark.

146. Apparatus in accordance with claim 142, wherein:
said processor determines a position of a first watermark;

said processor determines the embedded symbol m from a pair of consecutive watermarks; and said processor calculates the nominal position of the watermarks throughout the original medium for media verification purposes.

147. Apparatus in accordance with claim 146, wherein:
the nominal position of the watermarks $t_w$ is calculated by:

$$t_w = t_a + i(T + 4\Delta m)$$

wherein:

i equals 1, 2, 3, . . . ; and $t_a$ denotes the position of the first watermark.

148. Apparatus in accordance with claim 147, wherein:
media verification fails in the event watermarks are detected at a position which varies from the nominal position $t_w$ by more than +/−2Δ.

149. Apparatus in accordance with claim 147, wherein:
the extractor verifies the existence of watermarks throughout m $T_{step}$ intervals of the original medium.

150. Apparatus in accordance with claim 147, wherein:
media verification fails in the event that watermarks are not detected at a predetermined number of nominal positions.

151. Apparatus in accordance with claim 147, wherein:
the extractor examines the entire length of the original medium before determining media verification.

152. Apparatus in accordance with claim 151, wherein:
the original medium is examined at a rate greater than the real time rate of the original medium.

153. A Computer readable medium carrying a watermarked host signal, wherein:

said watermarked host signal comprises a host signal having a plurality of watermarks embedded in at least partially non-overlapping regions of the host signal, said watermarks comprising information representing logical values; and a relative position of at least two of said plurality of watermarks within the host signal represent embedded information.

154. A medium in accordance with claim 153, wherein:
the embedded information is used for copy-control in one of an audio host signal, a video host signal, or an image host signal.

155. A medium in accordance with claim 153, wherein:
the embedded information is used for media verification in one of an audio host signal or a video host signal.

156. A medium in accordance with claim 153, wherein:
the watermarks are positionable anywhere in the host signal.

157. A medium in accordance with claim 153, wherein:
the embedded information is recoverable based on a relative detected position of the watermarks.

158. A medium in accordance with claim 157, wherein:
the relative detected position of each watermark is within a maximum error deviation from an original embedded position of said watermark.

159. A medium in accordance with claim 153, wherein:
the watermarks are extracted at an extractor; and
said extractor compensates for at least one of time-scale variation or spatial-scale variation when extracting the watermarks.

160. A medium in accordance with claim 153, wherein:
the embedded information comprises a conditional copy symbol.

161. A medium in accordance with claim 160, wherein:
the conditional copy symbol comprises one of a no-copy signal, a pay-to-copy signal, a contract-to-copy signal, or a register-to-copy signal.

162. A medium in accordance with claim 153, wherein:
the embedded information enables generational copy control.

163. A medium in accordance with claim 153, wherein:
the embedded information comprises media verification information indicating the entire length of said medium.

164. A medium in accordance with claim 163, wherein:
said medium comprises one of a CD or a DVD.

165. A medium in accordance with claim 153, wherein:
the embedded information is a function of a separation between at least two of said watermarks.

* * * * *